N. O. STARKS.
Corn-Planter.
No. 212,761. Patented Feb. 25, 1879.
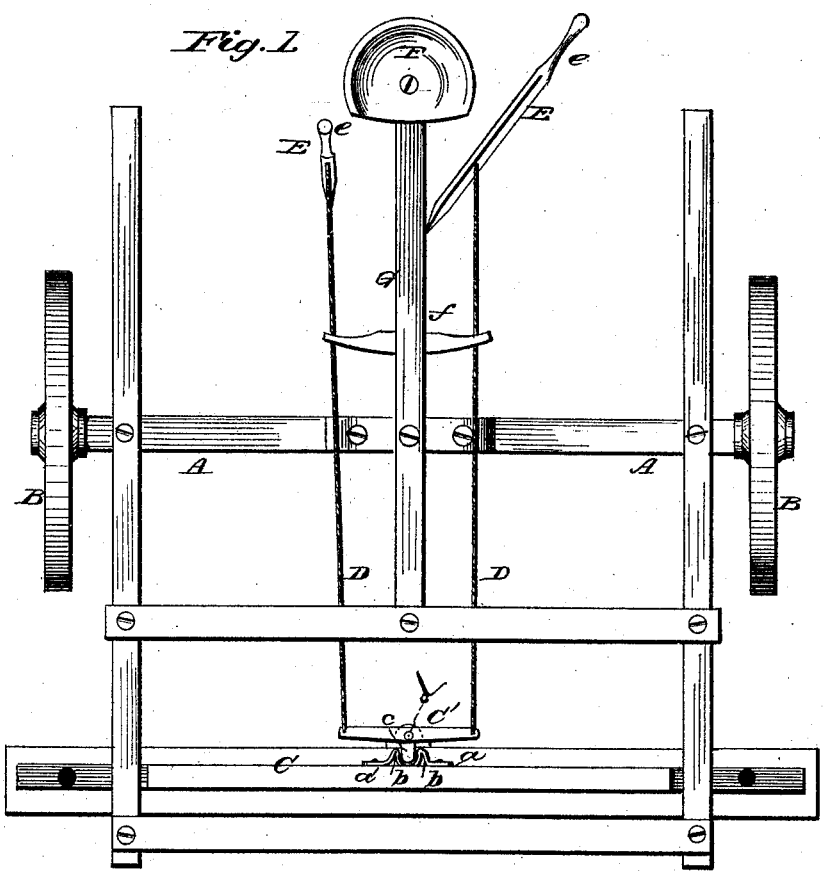
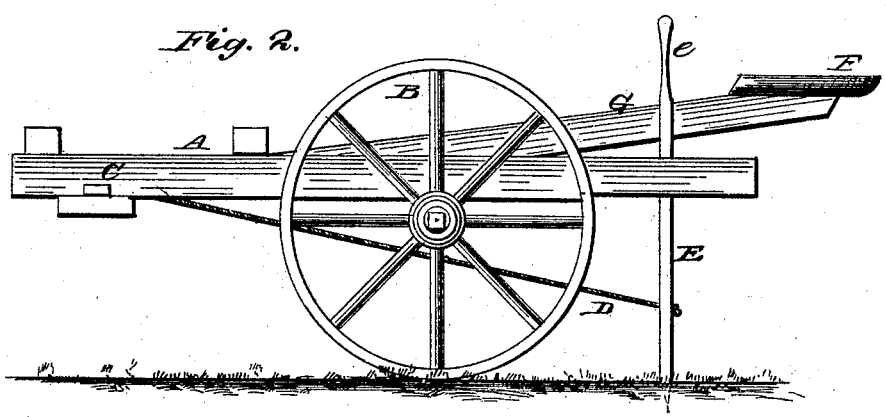

UNITED STATES PATENT OFFICE.

NILS O. STARKS, OF DEERFIELD, ASSIGNOR OF ONE-THIRD HIS RIGHT TO JOHN A. JOHNSON, OF MADISON, WISCONSIN.

IMPROVEMENT IN CORN-PLANTERS.

Specification forming part of Letters Patent No. 212,761, dated February 25, 1879; application filed October 28, 1878.

*To all whom it may concern:*

Be it known that I, NILS O. STARKS, of Deerfield, in the county of Dane and State of Wisconsin, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification, and in which—

Figure 1 is a top plan, and Fig. 2 is a side elevation.

Similar letters of reference indicate corresponding parts in all the figures.

This invention relates to devices for dropping the seed at regular intervals and at the precise places where the hills are to be—that is, where the longitudinal parallel marking-lines are intersected at right angles by the transverse marking-lines made on the field; and it consists in the combination, with the reciprocating seed-slide, of a lever operated by cords and pins, which are inserted into the hills by the operator in such a manner that the pulling upon these pins will operate the slide and drop the seed into hills in advance of those into which the operating-pins are inserted, substantially as hereinafter more fully described.

In the drawings, A A is the frame of a corn-planter, the details of which may be of any desired construction and combination; and B B, the wheels. C is the reciprocating seed-slide, which has secured upon its middle a plate, *a*, having two projecting lugs or catches, *b b*, so as to form a notch or recess for the insertion of the tongue *c* of the lever C', pivoted at *d*.

The two arms of the lever C' have secured to their ends cords or chains D D, the other ends of which are secured in sticks or pins E E, pointed at their ends, and having handles *e e* at their other ends.

F is the seat of the operator, which is placed back of the driver's seat, (not shown in the drawings;) and *f* is a cross-bar secured upon the seat-bar G, against which he can brace his feet.

The operator, seated on the seat F, grasps one of the pointed sticks E E in each hand by their handles *e e*, and inserts one of them (the one he holds in the right hand, for instance) into the nearest mark made by the crossing of the longitudinal by the transverse marking-line, pushing it well into the ground.

The length of cords D D is so regulated that when the front end of the machine has advanced a sufficient distance from the point where the stick is inserted into the ground to make the cord taut, the drop-holes in the seed-boxes will be exactly over a hill, or the intersection of one of the cross-lines with the longitudinal lines, so that at that moment the cord will pull upon lever C', which, by its tongue *c*, will operate the seed-slide, and the seed will be dropped from the seed-box vertically into the hill just below it. Meanwhile the left-hand stick E has been placed into the next cross-mark, and when the cord on that side is taut it will operate the seed-slide in a similar manner, but in the opposite direction; and so on, by alternately inserting the two marking sticks or pins E E into the ground, the seed-slide is set in advance to drop the corn in the exact places indicated, so that the hills will be in regular rows and checks, admitting of the cultivation of the corn both ways (that is, lengthwise of the field and cross-wise) without danger of uprooting or injuring the young plants.

The simplicity of this attachment admits of its being easily applied upon corn-planters of different kinds and construction, and at merely nominal cost. It is so simple as not to be liable to get out of order; but even if it should, its component parts are such that they can be easily replaced by new ones.

Having thus described my invention, I claim and desire to secure by Letters Patent of the United States—

As an improvement in corn-planters and seeding-machines, the combination of the reciprocating seed-slide C with the operating-lever C', cords D D, and marking-sticks E E, whereby the seed-slide is set in advance to drop the seed at the precise moment when the seed drops or holes in the seed-boxes are in a vertical line with the hills into which the seed is to be dropped, substantially as and for the purpose herein shown and specified.

In testimony that I claim the foregoing as my own I have hereto affixed my signature in presence of two witnesses.

NILS O. STARKS.

Witnesses:
F. W. HOYT,
CHAUNCY ABBOTT.